Sept. 10, 1935.  W. B. DAMSEL  2,014,313
PIPE COUPLING
Filed March 2, 1933
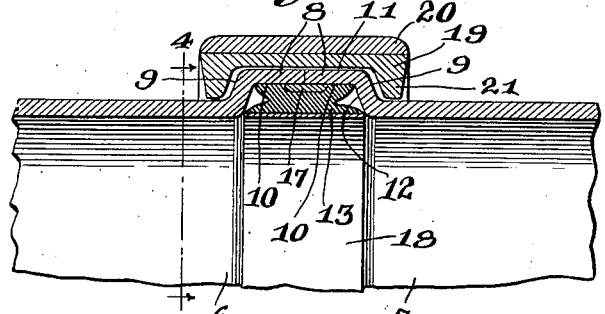
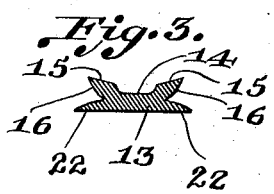
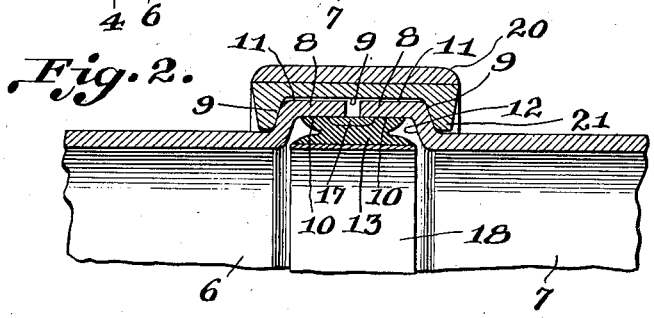
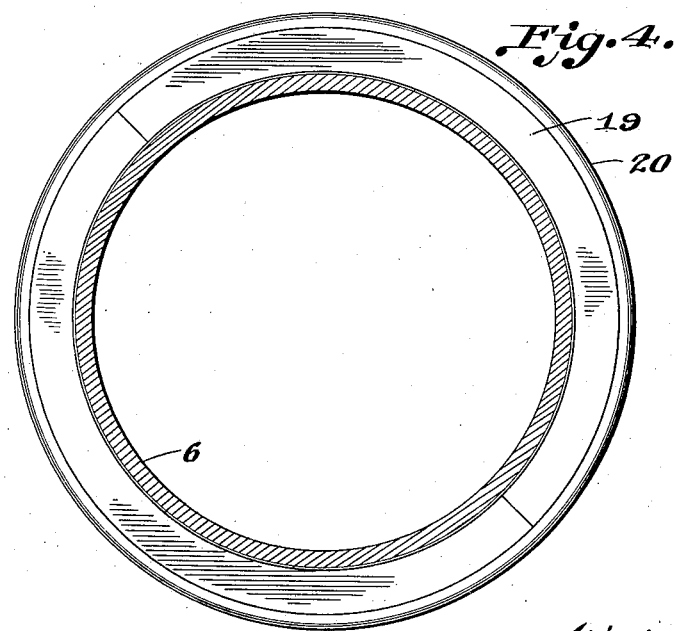
Inventor
William B. Damsel
By Seymour & Bright
Attorneys Patented Sept. 10, 1935

2,014,313

UNITED STATES PATENT OFFICE 2,014,313

PIPE COUPLING

William B. Damsel, New York, N. Y.

Application March 2, 1933, Serial No. 659,372

3 Claims. (Cl. 285—194)

This invention relates to improvements in pipe couplings, and more especially to a novel coupling designed to effectively seal the joint between adjacent ends of bell mouthed pipes.

One of the objects of the invention is to provide a coupling for pipes having expanded ends and designed to permit expansion or contraction of the pipes without liability of leakage.

Another object is to furnish a coupling for bell mouthed pipes which will effectively seal the joint while preventing turbulence, due to the fact that an internal sealing ring forming part of the coupling has an internal diameter equal to the internal diameter of the main portions of the pipes.

A further object is to supply a pipe coupling for bell mouthed pipes, comprising an elastic ring of rubber or the like, provided at its edges with lips designed to be forced into snug contact with the internal surfaces of the pipe ends by the pressure fluid passing through the pipe line.

Another object is to provide a pipe coupling having the above mentioned features and so designed as to be attached to the pipes without the use of bolts or the like.

With the foregoing objects outlined and with other objects in view which will appear as the description proceeds, the invention consists in the novel features hereinafter described in detail, illustrated in the accompanying drawing, and more particularly pointed out in the appended claims.

In the drawing,

Fig. 1 is a longitudinal sectional view of a portion of the improved coupling and a pair of bell end pipes, and showing the pipes in longitudinally expanded condition.

Fig. 2 is a similar view with the pipes contracted.

Fig. 3 is a transverse section of the resilient sealing ring employed in Figs. 1 and 2.

Fig. 4 is a transverse sectional view of the pipe line taken on the line 4—4 of Fig. 1.

Fig. 5 is a view similar to Fig. 3, but showing a modified sealing ring.

Referring to the drawing, 6 and 7 designate adjacent pipes in a pipe line, each pipe having its ends expanded to form a bell-shaped mouth 8. This formation places an external annular shoulder 9 at each end portion of each pipe, and between such shoulder and the extremity of the pipe, its enlarged end preferably has parallel inner and outer surfaces 10 and 11 which are coaxial with the axes of the pipes.

The enlarged pipe ends form an internal annular groove 12 in which is placed a resilient sealing ring 13 which is preformed into the cross sectional shape shown in Fig. 3. In other words, the outer surface of this ring has a groove 14, and at opposite sides thereof, are outwardly diverging annular surfaces 15 formed on sealing lips 16. When the sealing ring is placed in position, the inner surfaces 10 of the pipe ends will contact the surfaces 15 and thus contract the sealing lips so that a tight joint will be initially set up between the sealing ring and the surfaces 10. A metal reinforcing ring 17 can be placed in the groove 14, and it will not only limit the expansion of the central portion of the sealing ring, but will act as a guide for the pipe ends during expansion and contraction of the pipes.

Another metal ring 18 which is preferably as broad as the breadth of the sealing ring, is employed as a liner for the sealing ring, and as the ring 18 is of substantially the same diameter as the internal diameters of the pipes, the structures will be such as to prevent turbulence at the joint while fluid is passing through the pipe line.

The groove 12 permits pipe line fluid, however, to contact with the inner surfaces of the lips 16, and to force said lips against the pipe ends under the pressure existing in the pipe line.

The joint is preferably maintained by a housing consisting of an inner split band 19 and an outer endless or annular band 20. The split band may consist of two or more sections, and each section has inwardly extending flanges 21 designed to overlap the shoulders 9 to limit the extent of movement of pipes away from one another. After the sections of the inner band 19 are placed on the expanded pipe ends, the outer band 20 can simply be slipped over the sections of the inner band, and will then act to hold said sections in assembled relation.

Instead of employing the gasket or sealing ring 13 shown in Fig. 3, the inner lips 22 of that band may be eliminated to provide the modified form of gasket 13a shown in cross section in Fig. 5. The modified form will have a groove 14a, diverging outer surfaces 15a, and lips 16a, but its inner surface will be preferably of arc-shape, as shown at 23. This modified gasket may be employed with or without a liner ring similar to the one 18 shown in Figs. 1 and 2.

From the foregoing it is believed that the construction, operation and advantages of the invention may be readily understood, and it is apparent that changes may be made in the details disclosed, without departing from the spirit of the invention, as expressed in the claims.

What is claimed and desired to be secured by Letters Patent is:

1. Means for sealing a pair of pipes arranged end to end and having expanded extremities forming an internal groove, comprising a resilient sealing ring structure positioned within the groove and having lips snugly engaging the inner surfaces of the enlarged extremities of the pipes, and means within the groove bridging the meeting pipe ends for preventing extrusion of the sealing ring between said pipe ends during contraction of said pipes.

2. Means for sealing a pair of pipes arranged end to end and having expanded extremities forming an internal groove, comprising a resilient sealing ring structure positioned within the groove and having lips snugly engaging the inner surfaces of the enlared extremities of the pipes, said sealing ring structure having an external groove positioned between the lips, and a reinforcing ring occupying the groove.

3. Means for sealing a pair of pipes arranged end to end and having expanded extremities forming an internal groove, comprising detachable means surrounding the enlarged extremities for holding said extremities against unlimited movement away from one another but permitting limited movement of said extremities axially of the pipes, a resilient sealing ring structure positioned within said internal groove and having lips snugly engaging the inner surfaces of the enlarged extremities of the pipes, and means within the groove bridging the meeting pipe ends for preventing extrusion of the sealing ring between said pipe ends during contraction of said pipes.

WILLIAM B. DAMSEL.